United States Patent
Matsui et al.

[15] 3,684,765
[45] Aug. 15, 1972

[54] STABILIZATION OF SYNTHETIC POLYMERS

[72] Inventors: Katsuaki Matsui; Tomoyuki Kurumada; Noriyuki Ohta; Ichiro Watanabe; Keisuke Murayama; Syoji Morimura, all of Tokyo, Japan

[73] Assignee: Sankyo Company Limited

[22] Filed: Aug. 6, 1970

[21] Appl. No.: 61,861

[30] Foreign Application Priority Data

Jan. 8, 1970 Japan ..........................45/2619

[52] U.S. Cl. ..........................260/45.8 N, 260/293.87
[51] Int. Cl. ..........................C08f 45/60, C08g 51/60
[58] Field of Search..................................260/45.8 N

[56] References Cited

UNITED STATES PATENTS 3,431,232   3/1969   Murayama et al........260/45.8
3,503,982   3/1970   Murayama et al.........260/293

*Primary Examiner*—James A. Seidleck
*Assistant Examiner*—R. R. White
*Attorney*—McGlew and Toren

[57] ABSTRACT

A synthetic polymer composition is disclosed which is stabilized against photo- and thermal deterioration by incorporating in the composition an effective amount of a 4-aminopiperidine derivative.

6 Claims, No Drawings

STABILIZATION OF SYNTHETIC POLYMERS

This invention relates to the stabilization of synthetic polymers. More particularly, it is concerned with the stabilization of synthetic polymers against photo- and thermal-deterioration thereof by having incorporated therein, in a sufficient amount to inhibit such deterioration, an 4-aminopiperidine derivative having the formula

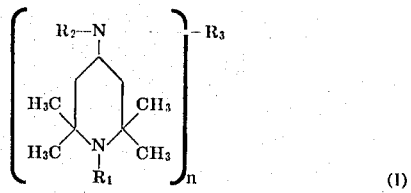

or a salt thereof.

In the above formula (I), $R_1$ represents hydrogen atom or an acyl group; $R_2$ represents hydrogen atom, an unsubstituted or substituted alkyl group, a cycloalkyl group, an unsubstituted or substituted aryl group, an unsubstituted or substituted aralkyl group or the group of the formula

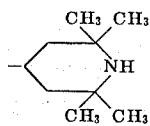

$n$ is an integer of 1 to 3 inclusive; and, when $n$ is 1, $R_3$ represents hydrogen atom, an acyl group, an alkoxycarbonyl group, carbamoyl group, thiocarbamoyl group, a N-substituted carbamoyl group, a N-substituted thiocarbamoyl group or a monovalent group derived by removing one hydroxyl group from an oxoacid or it may form, together with $R_2$, the group of the formula

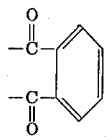

when $n$ is 2, $R_3$ represents a diacyl group, a N-substituted dicarbamoyl group, a N-substituted bisthiocarbamoyl group, carbonyl group or a divalent group derived by removing two hydroxyl groups from an oxoacid, when $n$ is 3, $R_3$ represents a triacyl group, a N-substituted tricarbamoyl group, a N-substituted tristhiocarbamoyl group or a trivalent group derived by removing three hydroxyl groups from an oxoacid.

In the above formula (I), the group $R_1$ may be illustrated as follows:

The $R_1$ may be hydrogen atom or an aliphatic, aromatic, alicyclic or heterocyclic acyl group, e.g., acetyl, propionyl, butyroyl, stearoyl, acryloyl, benzoyl, α-naphthoyl, phenoxyacetyl, cyclohexanoyl, o-, m-, or p-chlorobenzoyl, o-, m-, or p-toluoyl, isonicotinoyl or furoyl.

The $R_2$ may be straight or branched alkyl groups, e.g., methyl, ethyl, n-butyl, tert.butyl, octyl or stearyl; hydroxyalkyl groups, e.g., 1-hydroxyethyl, 2-hydroxyethyl, 4-hydroxy-n-butyl or 8-hydroxyoctyl; alkoxycarbonylalkyl groups, e.g., 2-methoxycarbonylethyl, 2-ethoxycarbonyl-n-propyl, 3-isopropoxycarbonyl-n-butyl or 4-ethoxycarbonyloctyl; 2-benzoyloxyethyl; 2-o-, m- or p-toluidinocarbonyloxyethyl; aminoalkyl groups, e.g., diethylaminomethyl, dimethylaminoethyl, or 3-di-n-propylamino-n-propyl; cycloalkyl groups, e.g., cyclopentyl or cyclohexyl; aryl groups, e.g., phenyl or naphthyl; alkyl-, alkoxy-, halogeno- or hydroxy-substituted aryl groups, e.g., o-, m- or p-tolyl, o-, m- or p-tert.butylphenyl, o-, m- or p-octylphenyl, o-, m- or p-methoxyphenyl, o-, m- or p-n-butoxyphenyl, o-, m- or p-octoxyphenyl, p-, m- or p-chlorophenyl, o-, m- or p-bromophenyl or o-, m- or p-hydroxyphenyl; aralkyl groups, e.g., benzyl or phenethyl; substituted aralkyl groups having as a substituent alkyl, alkoxy, halogen or hydroxy in the aryl moiety, e.g., o-, m- or p-methylbenzyl, o-, m- or p-tert.butylbenzyl, o-, m- or p-octoxybenzyl, o-, m- or p-chlorobenzyl, o-, m- or p-hydroxyphenethyl, 4-hydroxy-3,5-ditert.butylbenzyl; or 2,2,6,6-tetramethyl-4-piperidyl.

When $n$ is 1, the $R_3$ may be those acyl groups as listed above; methoxycarbonyl, ethoxycarbonyl or tert.butoxycarbonly; carbamoyl; thiocarbamoyl; ethylcarbamoyl, n-butylcarbamoyl, cyclohexylcarbamoyl, phenylcarbamoyl, o-, m- or p-chlorophenylcarbamoyl, o-, m- or p-tolylcarbamoyl or α-naphthylcarbamoyl; ethylthiocarbamoyl, n-butylthiocarbamoyl, cyclohexylthiocarbamoyl or phenylthiocarbamoyl.

And, as an oxoacid which provides a monovalent group, there may be illustrated by those oxoacids containing boron, silicon, phosphorus or sulfur atom, for example, an unsubstituted or substituted boric acid, e.g., orthoboric acid; an unsubstituted or substituted silicic acid, e.g., orthosilicic acid or dimethylsilane diol; an unsubstituted or substituted phosphorus acid, e.g., phosphorous acid; an unsubstituted or substituted phosphoric acid, e.g., phosphoric acid; an unsubstituted or substituted phosphinic acid, e.g., phosphinic acid; an unsubstituted or substituted phosphinous acid, e.g., phosphinous acid; an unsubstituted or substituted phosphonic acid, e.g., phosphonic acid; an unsubstituted or substituted sulfuric acid, e.g., sulfuric acid; an unsubstituted or substituted sulfurous acid, e.g., sulfurous acid; an unsubstituted or substituted sulfenic acid, e.g., sulfenic acid; an unsubstituted or substituted sulfinic acid, e.g., benzenesulfinic acid; and an unsubstituted or substituted sulfonic acid, e.g., benzensulfonic acid, p-toluenesulfonic acid, p-n-dodecylbenzenesulfonic acid, methanesulfonic acid. When $n$ is 2, the $R_3$ may be oxalyl, malonyl, adipyl, fumaryl, hexahydroterephthalyl or terephthalyl; tolylene-2,4-dicarbamoyl, hexamethylene-1,6-dicarbamoyl, diphenylmethane-p,p'-dicarbamoyl or diphenylether-p,p'-dicarbamoyl; tolylene-2,4-bisthiocarbamoyl, hexamethylene-1,6-bisthiocarbamoyl or diphenylmethane-p,p'-bisthiocarbamoyl; and carbonyl.

And, as an oxoacid which provides a divalent group, there may be illustrated by those oxoacids listed hereinabove. Representative of the oxoacids which may be employed in this case are benzene-1,3-disulfonic acid, phenylphosphoric acid, boric acid and the like.

When $n$ is 3, the $R_3$ may be benzene-1,3,5-tricarbonyl, benzene-1,3,4-tricarbonyl, cyclohexane-1,3,5-tricarbonyl, or furane-2,3,4-tricarbonyl; benzene-1,3,5-tricarbamoyl or benzene-1,3,4-tristhiocarbamoyl; propane-1,2,3-triyl or hexane-1,3,6triyl; benzene-1,3,5-triyl; and benzene-1,3,5-triethylene. And, as an oxoacid which provides a trivalent group, there may be illustrated by those oxoacids listed hereinabove. Representative of the oxoacids which may be employed in this case are benzene-1,3,5-trisulfonic acid, phosphoric acid, phosphorus acid, boric acid and the like.

The term "synthetic polymer" as used herein are intended to embrace polyolefins including
  homopolymers of olefins such as low-density polyethylene, high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrenebutadiene copolymer, acrylonitrile-styrene-butadiene copolymer and the like;

polyvinyl chlorides and polyvinylidene chlorides including
  homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;

polyesters;
polyamides; and
polyurethanes.

These synthetic polymers have been widely utilized in the art, in view of their excellent properties, in various forms or shapes, for example, filament, fiber, yarn, film, sheet, other molded article, latex and foam. However, these polymers have some drawbacks such as poor light- and heat-stabilities and the like. Stated illustratively, polyolefins and polyurethane elastomers frequently tend to undergo severe deterioration when exposed to light such as sunlight or ultraviolet ray, and polyvinyl chloride and polyvinylidene chloride frequently tend to deteriorate and become colored by the action of light and heat together with elimination of hydrogen chloride therefrom. Polyamides are also frequently subjected to photo deterioration. For the purpose of stabilizing these synthetic polymers against such deterioration, there have heretofore been proposed in the art a number of stabilizers; for example, for polyolefins, benzotriazole compounds and benzophenone compounds; for polyurethanes, phenol compounds and benzophenone compounds; and for polyvinyl chloride and polyvinylidine chloride, lead salts such as basic lead silicate and tribasic lead maleate, and organotin compounds such as dibutyltin laurate and dibutyltin maleate.

Although such prior stabilizers are known to be considerably satisfactory, there still remained some problems to be dissolved or improved.

Thus, numerous attempts have been made in the art to discover and develop new and more effective stabilizers.

As a result of our extensive investigations, it has been unexpectedly found that the 4-aminopiperidine derivatives (I) and salts thereof of the present invention exhibit a high degree of stabilizing action on synthetic polymers, e.g. polyolefins, polyvinyl chloride, polyvinylidene chloride, polyamides and polyurethanes against the deteriorations thereof.

It is, accordingly, a primary object of this invention to provide synthetic polymer compositions stabilized against photo- and thermal-deterioration thereof by having incorporated therein a sufficient amount to inhibit said deterioration of the 4-aminopiperidine derivatives (I) or salts thereof.

Other objects of this invention will become apparent to those skilled in the art from the following description of this invention.

Representative examples of the 4-aminopiperidine derivative having the formula (I) which may be employed in this invention are illustratively listed hereinbelow. It is, however, to be understood that the present invention is not limited to those illustrated compounds.

1. 4-acetamido-2,2,6,6-tetramethylpiperidine,
2. 4-stearamido-2,2,6,6-tetramethylpiperidine,
3. 4-acrylamido-2,2,6,6-tetramethylpiperidine,
4. 4-methacrylamido-2,2,6,6-tetramethylpiperidine,
5. 4-crotonamido-2,2,6,6-tetramethylpiperidine,
6. 1-acryloyl-4-acrylamido-2,2,6,6-tetramethylpiperidine,
7. 4-($\beta$-hydroxyethoxycarbonamido)-2,2,6,6-tetramethylpiperidine,
8. 4-phenylacetamido-2,2,6,6-tetramethylpiperidine,
9. 4-cyclohexanecarbonamido-2,2,6,6-tetramethylpiperidine,
10. 4-benzamido-2,2,6,6-tetramethylpiperidine,
11. 4-(p-chlorobenzamido)-2,2,6,6-tetramethylpiperidine,
12. 4-(o-toluamido)-2,2,6,6-tetramethylpiperidine,
13. 4-($\beta$-naphthamido)-2,2,6,6-tetramethylpiperidine,
14. 4-(2-furancarbonamido)-2,2,6,6-tetramethylpiperidine,
15. 4-ureido-2,2,6,6-tetramethylpiperidine,
16. 4-(3-ethylureido)-2,2,6,6-tetramethylpiperidine,
17. 4-(3-benzylureido)-2,2,6,6-tetramethylpiperidine,
18. 4-(3-cyclohexylureido)-2,2,6,6-tetramethylpiperidine,
19. 4-(3-phenylureido)-2,2,6,6-tetramethylpiperidine,
20. 4-(3-p-chlorophenylureido)-2,2,6,6-tetramethylpiperidine,
21. 4-(3-$\alpha$-naphthylureido)-2,2,6,6-tetramethylpiperidine,
22. 4-thioureido-2,2,6,6-tetramethylpiperidine,
23. 1-ethyl-3-(2,2,6,6-tetramethyl-4-piperidyl)thiourea,
24. 1-cyclohexyl-3-(2,2,6,6-tetramethyl-4-piperidyl)thiourea,
25. 4-(3,3-dimethylureido)-2,2,6,6-tetramethylpiperidine,
26. 4-(1-piperidinecarbonamido)-2,2,6,6-tetramethylpiperidine,
27. 4-methanesulfenamido-2,2,6,6-tetramethylpiperidine,
28. 4-benzenesulfenamido-2,2,6,6-tetramethylpiperidine, 29. 4benzenesulfinamido-2,2,6,6-tetramethylpiperidine,
30. 4-(p-toluenesulfonamido)-2,2,6,6-tetramethylpiperidine,
31. 4-methanesulfonamido-2,2,6,6-tetramethylpiperidine,
32. 4-amino-2,2,6,6-tetramethylpiperidine,
33. 4-(β-hydroxyethylamino)-2,2,6,6-tetramethylpiperidine,
34. 4-(2-ethoxycarbonylpropylamino)-2,2,6,6-tetramethylpiperidine,
35. 4-cyclohexylamino-2,2,6,6-tetramethylpiperidine,
36. 4-(4-hydroxy-3,5-di-tert.butylbenzylamino)-2,2,6,6-tetramethylpiperdine,
37. 4-(p-anisidino)-2,2,6,6-tetramethylpiperidine,
38. bis(2,2,6,6-tetramethyl-4-piperidyl)amine,
39. 4-(N-methylbenzamido)-2,2,6,6-tetramethylpiperidine,
40. 4-(N-cyclohexylbenzamido)-2,2,6,6-tetramethylpiperidine,
41. 4-(N-cyclohexylmethacrylamido)-2,2,6,6-tetramethyl piperidine,
42. 1-stearyl-3-cyclohexyl-3-(2,2,6,6-tetramethyl-4-piperidyl)urea,
43. 1-(p-tolyl)-3-cyclohexyl-3-(2,2,6,6-tetramethyl-4-piperidyl)urea,
44. 4-(N-dimethylaminomethylacetamido)-2,2,6,6-tetramethylpiperidine,
45. 4-(N-benzoyloxyethylbenzamido)-2,2,6,6-tetramethylpiperidine,
46. 1-(p-tolyl)-3-[2-(p-toluidinocarbonyloxyethyl)]-3-(2,2,6,6-tetramethyl-4-piperidyl)urea,
47. 4-(N-benzylbenzamido)-2,2,6,6-tetramethylpiperidine,
48. 4-(N-stearoylanilino)-2,2,6,6-tetramethylpiperidine,
49. 4-(N-phenylbenzamido)-2,2,6,6-tetramethylpiperidine,
50. 4-phthalimido-2,2,6,6-tetramethylpiperidine,
51. 1,3-bis(2,2,6,6-tetramethyl-4-piperidyl)urea,
52. N,N'-bis(2,2,6,6-tetramethyl-4-piperidyl)oxalamide,
53. N,N'-bis(2,2,6,6-tetramethyl-4-piperidyl)malonamide,
54. N,N'-bis(2,2,6,6-tetramethyl-4-piperidyl)adipamide,
55. N,N'-bis(2,2,6,6-tetramethyl-4-piperidyl)fumaramide,
56. N,N'-bis(2,2,6,6-tetramethyl-4-piperidyl)terephthalamide,
57. 1,6-bis[3-(2,2,6,6-tetramethyl-4-piperidyl)ureido]-n-hexane,
58. p,p'-bis[3-(2,2,6,6-tetramethyl-4-piperidyl)ureido]-diphenylmethane,
59. 2,4-bis [3-(2,2,6,6-tetramethyl-4-piperidyl)ureido]-toluene,
60. N,N'-bis(2,2,6,6-tetramethyl-4-piperdyl)-1,3-benzenesulfonamide,
61. tris(2,2,6,6-tetramethyl-4-piperidylamino)phosphine,
62. tris(2,2,6,6-tetramethyl-4-piperidylamino)phosphine oxide,
63. tris(2,2,6,6-tetramethyl-4-piperidylamino)boron,
64. N,N',N''-tris(2,2,6,6-tetramethyl-4-piperidyl)-trimellitamide.
65. 4-(N-trimethylsilyl-2-dimethylsilyloxyethylamino)-2,2,6,6-tetramethylpiperidine,
66. bis(2,2,6,6-tetramethyl-4-piperidylamino)-dimethylsilane, and
67. N,N'-bis[N-(2,2,6,6-tetramethyl-4-piperidyl)-N-cyclohexyl]sulfindiamide.

As explained hereinabove, the salts of the 4-aminopiperidine derivatives (I) are also contemplated to be included within the purview of the present invention. Examples of the salts of the 4-aminopiperidine derivatives (I) which may be employed in the present invention include inorganic acid salts such as phosphate, carbonate and the like; as well as organic acid salts such as citrate, stearate, benzoate, and the like.

The 4-aminopiperidine derivatives (I) which may be effectively utilized in this invention are new substances except for 4-acetamido-2,2,6,6-tetramethylpiperidine and 4-amino-2,2,6,6-tetramethylpiperidine [See, Annalen der Chemie, 417, 118 (1918) and Izv. Akad. Nauk SSSR Ser. Khim., 1477 (1966)].

Of the 4-aminopiperidine derivatives (I), the new compounds may be readily prepared by various procedures. The preparations of some representative 4-aminopiperidine derivatives which may be employed in this invention are illustratively disclosed hereinbelow.

The preparation of the 4-aminopiperidine derivatives represented by the above-mentioned numbers 2 – 6, 8 – 14, 39 – 41, 44, 45, 47 – 50, 52 – 56 and 64

The 4-aminopiperidine derivatives can be prepared by reacting a piperidine derivative having the formula

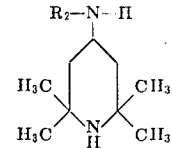

wherein $R_2$ is as defined above with the corresponding acid anhydride such as an acid anhydride having the formula $(R_3CO)_2O$ wherein $R_3$ is as defined above or the corresponding acid halide such as an acid halide having the formula $R_3COCl$ wherein $R_3$ is as defined above, respectively.

The preparation of the 4-aminopiperidine derivative represented by the above-mentioned number 7

The 4-aminopiperidine derivative can be prepared according to the following reaction schema:

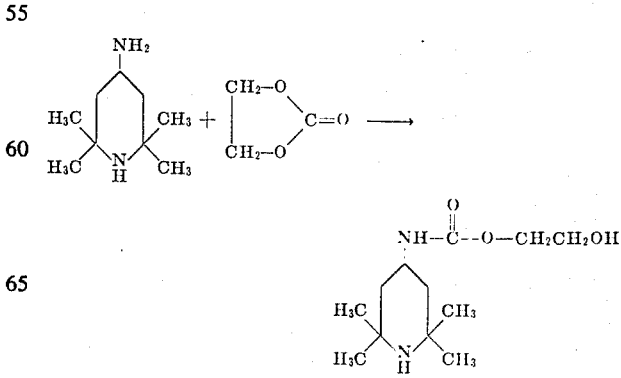

The preparation of the 4-aminopiperidine derivatives represented by the above-mentioned numbers 15 and 51

The 4-aminopiperdine derivatives can be prepared according to the following reaction schema, respectively:

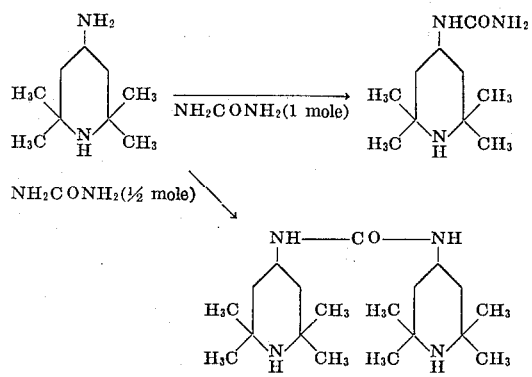

The preparation of the 4-aminopiperdine derivatives represented by the above-mentioned numbers 16–21, 23, 24, 42, 43, 46 and 57–59

The 4-aminopiperidine derivatives can be prepared according to the following reaction schema, respectively:

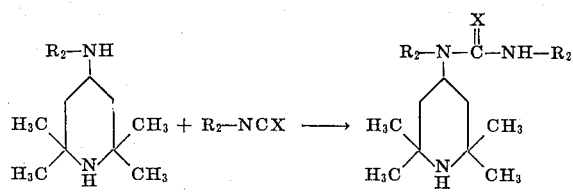

wherein X represents oxygen or sulfur atom and $R_2$'s may be the same or different and each is as defined above.

The preparation of the 4-aminopiperidine derivatives represented by the above-mentioned numbers 22, 25 and 26

The 4-amino-2,2,6,6-tetramethylpiperidine can be prepared by reacting with $H_2N$-CS-$NH_2$, $H_2N$-CO-$N(CH_3)_2$ or

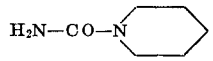

respectively.

The preparation of the 4-aminopiperidine derivatives represented by the above-mentioned numbers 27–31 and 60–63

The 4-aminopiperidine derivatives can be prepared by reacting a piperidine derivative having the formula

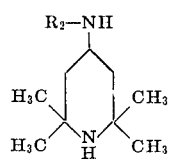

wherein $R_2$ is as defined above with the corresponding acid halide such as a sulfenic acid chloride having the formula $R_3SCl$ wherein $R_3$ is as defined above or a sulfinic acid chloride having the formula $R_3SOCl$ wherein $R_3$ is as defined above, respectively.

The preparation of the 4-aminopiperidine derivatives represented by the above-mentioned numbers 33, 35 and 37

The 4-aminopiperidine derivatives can be prepared according to the following reaction schema, respectively:

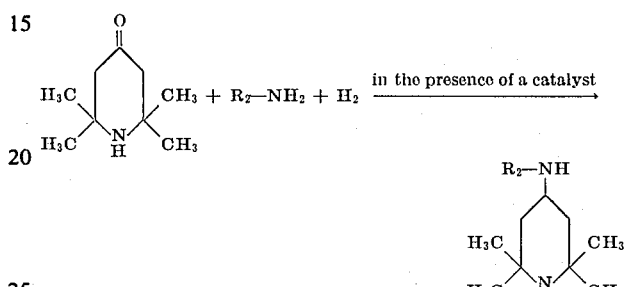

wherein $R_2$ is as defined above.

The preparation of the 4-aminopiperidine derivative represented by the above-mentioned number 34

The 4-aminopiperidine derivative can be prepared according to the following reaction schema:

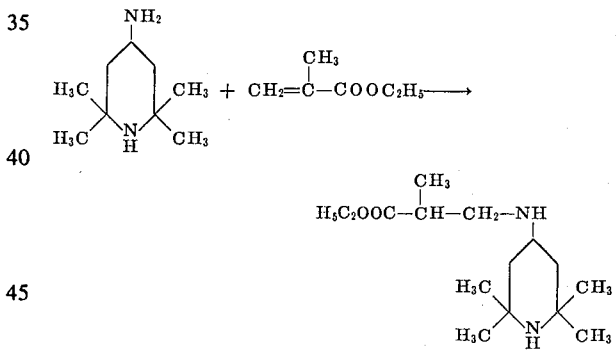

The preparation of the 4-aminopiperidine derivative represented by the above-mentioned number 38

The 4-aminopiperidine derivative can be prepared according to the following schema:

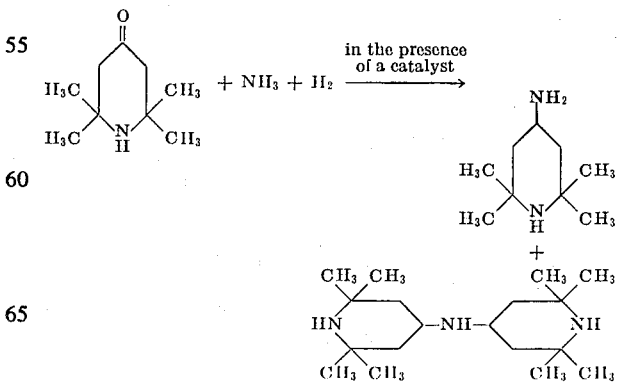

Among the 4-aminopiperidine derivatives of the formula (I) which may be employed in this invention, representative one of the new 4-aminopiperidine derivatives, i.e., 4-(3-phenylureido)-2,2,6,6-tetramethylpiperidine, can be prepared according to the following Preparation, the disclosure of which will be incorporated herein as a reference.

PREPARATION 4-(3-phenylureido)-2,2,6,6-tetramethylpiperidine

To an ice-cooled solution of 15.6 g. of 4-amino-2,2,6,6-tetramethylpiperidine in 100 ml. of benzene was added dropwise with stirring a solution of 12.0 g. of phenyl isocyanate in 30 ml. of benzene. After completion of the dropwise-addition, the resulting mixture was stirred at room temperature for 4 – 5 hours. Then, the solvent was distilled off and the crystalline residue was recrystallized from ethyl acetate to give 23.6 g. of the desired product as white crystals melting at 157°C.

Analysis for $C_{16}H_{25}N_3O$
Calculated: C, 69.78%; H, 9.15%; N, 15.26%.
Found: C, 69.84%; H, 9.11%; N, 15.25%.
IR spectrum (Nujol mull):

$\nu$ NH 3350 cm$^{-1}$;

$\nu$ C = O 1645 cm$^{-1}$.

The above-mentioned synthetic polymers may be any shape or form and may, for example, be in the form of a powder, filament, fiber, film, foam, sheet or other shaped article.

The 4-aminopiperidine derivatives (I) or salts thereof employed as a stabilizer in the present invention may be readily incorporated into the synthetic polymers by any of the various standard procedures commonly utilized in the art. The stabilizer may be incorporated into the synthetic polymers at any desired stage prior to the manufacture of shaped articles therefrom. Thus, for example, the stabilizer in the form of a dry powder may be admixed with the synthetic polymer, or a suspension or emulsion of the stabilizer may be admixed with a solution, suspension or emulsion of the synthetic polymer.

The amount of the 4-aminopiperidine derivatives (I) or salts thereof employed in the synthetic polymer in accordance with the present invention may be varied widely, depending upon the type, properties and particular uses of the synthetic polymer to be stabilized. In general, the 4-aminopiperidine derivatives of the formula (I) or salts thereof may be added in an amount ranging from 0.01 to 5.0 percent by weight, based on the amount of the synthetic polymer, but the practical range is varied depending upon the type of the synthetic polymer, that is 0.01 to 2.0 percent by weight, preferably 0.02 to 1.0 percent by weight for polyolefins, 0.01 to 0.1 percent by weight, preferably 0.02 to 0.5 percent by weight for polyvinyl chloride and polyvinylidene chloride, and 0.01 to 5.0 percent by weight, preferably 0.02 to 2.0 percent by weight for polyurethanes and polyamides.

The present stabilizer may be used alone or in combination with other known stabilizers, fillers, pigments and the like.

If desired, two or more of the present stabilizers i.e., the 4-aminopiperidine derivatives of the formula (I) and salts thereof may also be satisfactorily used in this invention.

In order that the invention may be better understood, the following Examples are given solely for the purpose of illustration of this invention. In the Examples, all parts are given by weight unless otherwise indicated.

EXAMPLE 1

Into 100 parts of polypropylene ["Noblen JH H–G," trade name, available from Mitsui Toatsu Chemicals Inc., Japan, employed after twice recrystallizations from monochlorobenzene] was incorporated 0.25 part of each of the test compounds of this invention indicated below. The resulting mixture was mixed and melted and then molded into a sheet having a thickness of 0.5 mm. under heating and pressure.

As a control, the polypropylene sheet was prepared in a similar manner to that described above without any of stabilizers for comparative purpose.

Then, all of these sheets thus formed were tested for the brittleness time (which means the time, expressed in terms of hour, until the test sheet will become brittle) under ultraviolet ray irradiation at a temperature of 45°C by means of the fade meter prescribed in Japanese Industrial Standard JIS–1044 entitled "Testing Method of Color Fastness to Light of Dyed Textiles and Dyestuffs," Paragraph 3.8 (in English).

The results are given in the following Table 1.

Table 1.

| Test compound No.* | Brittleness time (hours) |
|---|---|
| 2 | 860 |
| 3 | 620 |
| 4 | 780 |
| 5 | 1,400 |
| 6 | 860 |
| 7 | 1,100 |
| 10 | 1,200 |
| 15 | 640 |
| 18 | 1,080 |
| 19 | 980 |
| 24 | 740 |
| 30 | 580 |
| 33 | 780 |
| 34 | 860 |
| 35 | 820 |
| 36 | 1,120 |
| 37 | 480 |
| 38 | 980 |
| 40 | 440 |
| 41 | 520 |
| 42 | 920 |
| 43 | 880 |
| 45 | 760 |
| 46 | 600 |
| 51 | 1,060 |
| 54 | 940 |
| 59 | 880 |
| 62 | 820 |
| none | 100 |

*The number of the test compound is the same as defined hereinabove.

EXAMPLE 2

Into 100 parts of high-density polyethylene ["Hi-Zex," trade name, available from Mitsui Toatsu Chemicals Inc., Japan, employed after twice recrystallizations from toluol] were incorporated 0.1 part of each of the test compounds of this invention indicated below. The resulting mixture was made into a sheet by the same procedure as in the above Example 1.

The sheet thus formed was tested for the brittleness time by the same test method as in the above Example 1. The results are given in the following Table 2.

TABLE 2.

| Test compound No.* | Brittleness time (hours) |
|---|---|
| 3 | 1,320 |
| 4 | 1,500 |
| 5 | 3,080 |
| 6 | 1,660 |
| 7 | 2,860 |
| 10 | 2,920 |
| 15 | 1,280 |
| 18 | 2,740 |
| 19 | 2,580 |
| 33 | 1,400 |
| 35 | 1,620 |
| 37 | 1,100 |
| 38 | 1,880 |
| 40 | 920 |
| 41 | 1,060 |
| 42 | 2,400 |
| 43 | 2,280 |
| 45 | 1,660 |
| 46 | 1,340 |
| 51 | 2,720 |
| 59 | 2,480 |
| none | 400 |

*The number of the test compound is the same as defined hereinabove.

EXAMPLE 3

Into 100 parts of 6-nylon ["CM 1011," trade name, available from Toyo Rayon Co., Ltd., Japan, containing no stabilizer] was incorporated 0.25 part of each of the test compounds of this invention indicated below. The resulting mixture was heated and melted and then molded into a film having a thickness of about 0.1 mm. under pressure. The film thus formed was aged under the following aging condition and thereafter subjected to a tensile test to determine the retentions of ultimate tensile strength and ultimate elongation by a standard method.

AGING TEST

1. Exposure to ultraviolet ray for 300 hours in the fade meter described above at 45°C.
2. Aging at 160°C for 2 hours in a Geer's aging tester prescribed in Japanese Industrial Standard JIS–K–6301 entitled "Physical Testing Methods for Vulcanized Rubber," Paragraph 6.5 (in English).

The results are given in the following Table 3.

2. Aging at 160°C for 2 hours in a Geer's aging tester prescribed in Japanese Industrial Standard JIS–K–6301 entitled "Physical Testing Methods for Vulcanized Rubber," Paragraph 6.5 (in English).

The results are given in the following Table 3.

Table 3.

| Test Compound No.* | Fade meter (after 300 hours) | | Geer's aging tester (2 hours, 160°C) | |
|---|---|---|---|---|
| | Retention of ultimate elongation (%) | Retention of ultimate tensile strength(%) | Retention of ultimate elongation (%) | Retention of ultimate tensile strength(%) |
| 3 | 72 | 54 | 73 | 67 |
| 6 | 60 | 51 | 58 | 66 |
| 7 | 72 | 65 | 43 | 54 |
| 10 | 74 | 58 | 71 | 62 |
| 38 | 73 | 54 | 80 | 71 |
| 51 | 67 | 59 | 58 | 54 |
| 56 | 71 | 63 | 70 | 63 |
| 59 | 68 | 59 | 67 | 58 |
| 62 | 69 | 60 | 59 | 56 |
| none | 6 | 38 | 7 | 52 |

*The number of the test compound is the same as defined hereinabove.

EXAMPLE 4

Into 100 parts of polyurethane prepared from polycaprolactone ["E–5080," trade name, available from The Nippon Elastollan Industries Ltd., Japan] was incorporated 0.5 part of each of the test compounds of this invention indicated below. The resulting mixture was heated and melted and then molded into a sheet having a thickness of about 0.5 mm. The sheet thus formed was subjected to the exposure to ultraviolet ray for 15 hours in the fademeter as specified in the above Example 1 at 45°C and then tested for the retentions of ultimate elongation and ultimate tensile strength as in the above Example 3.

The results are given in the following Table 4.

Table 4.

| Test compound No.* | Retention of ultimate elongation (%) | Retention of ultimate tensile strength (%) |
|---|---|---|
| 3 | 83 | 78 |
| 6 | 84 | 81 |
| 7 | 88 | 83 |
| 10 | 97 | 79 |
| 38 | 80 | 76 |
| 51 | 99 | 92 |
| 54 | 83 | 86 |
| 59 | 84 | 76 |
| 62 | 85 | 83 |
| none | 75 | 53 |

*The number of the test compound is the same as defined hereinabove.

EXAMPLE 5.

Into 100 parts of polyvinyl chloride ["Geon 103 EP," trade name, available from The Japanese Geon Co. Ltd., Japan] were incorporated 1.0 part of lead stearate, 0.5 part of dibasic lead phosphite, 0.5 part of barium stearate, 0.5 part of cadmium stearate and 0.2 part of each of the test compounds of this invention indicated below. The resulting mixture was blended and kneaded for 4 minutes on a kneading roll at 0.5 mm. The sheet was tested for the discoloration degree thereof by the aging test method set forth below.

AGING TEST

1. Exposure to the sunshine carbon apparatus prescribed in Japanese Industrial Standard JIS Z-0230 entitled "Accelerated Weathering test of Rust Proofing Oils," Paragraph 2 for 600 hours.
2. The sheet was aged for 90 minutes at 170°C in the Geer's aging tester prescribed in the above Example 3.

The results are given in the following Table 5.

Table 5.

| Test compound No.* | Discoloration | |
|---|---|---|
| | Sunshine carbon apparatus | Geer's aging tester (after 90 minutes, |

| | (after 600 hours) | 170°C) |
|---|---|---|
| 3 | Pale yellow | Yellowish white |
| 6 | " | Pale yellow |
| 7 | " | " |
| 10 | " | " |
| 38 | Yellow | Pale brown |
| 51 | Pale yellow | Yellow |
| 54 | " | Pale yellow |
| 59 | Yellow | Yellowish brown |
| 62 | Pale yellow | Pale yellow |
| none | Dark brown | Black |

*The number of the test compound is the same as defined hereinabove.

From the above results it can be seen that the 4-aminopiperidine derivatives of this invention exhibit a high degree of stabilizing effect on synthetic polymers against deteriorations thereof.

What is claimed is:

1. A synthetic polymer composition stabilized against photo- and thermal deterioration, wherein said synthetic polymer is selected from the group consisting of polyolefins, polyvinyl chlorides, polyvinylidene chlorides, polyesters, polyamides having recurring amide groups as integral parts of the main polymer chain and polyurethanes, and wherein there is incorporated in the composition in an amount sufficient to inhibit said deterioration, a 4-aminopiperidine derivative having the formula

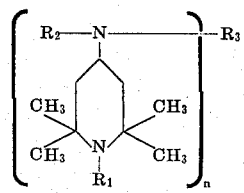

wherein
$R_1$ represents hydrogen or acyl;
$R_2$ represents hydrogen, alkyl, hydroxyalkyl, alkoxycarbonylalkyl, aryloxycarbonylalkyl, alkarylaminocarbonyloxyalkyl, aminoalkyl, cycloalkyl, aryl which may be substituted with alkyl, alkoxy, halogen or hydroxy; aralkyl which may be substituted with alkyl, alkoxy, halogen or hydroxy in the aryl moiety or the group of the formula

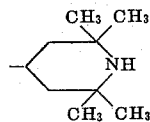

wherein n is an integer of 1 to 3 inclusive; and when n is 1,
$R_3$ represents hydrogen, acyl, alkoxycarbonyl, carbamoyl, thiocarbamoyl, N-alkylcarbamoyl, N-arylcarbamoyl which may be substituted with halogen or alkyl in the aryl moiety, N-alkylthiocarbamoyl, N-cyloalkylthiocarbamoyl, N-arylthiocarbamoyl or a monovalent group derived by removing one hydroxyl group from a boric, silicic, phosphorous, phosphoric, phosphinic, phosphinous, phosphonic, sulfuric, sulfurous, sulfenic, sulfinic or sulfonic acid or it may form, together with $R_2$, the group or the formula

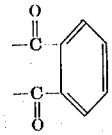

when n is 2,
$R_3$ represents diacyl, arylenedicarbamoyl, alkylenedicarbamoyl, diarylalkanedicarbamoyl, diaryletherdicarbamoyl, arylenebisthiocarbamoyl, alkylenedithiocarbamoyl, diarylalkanedithiocarbamoyl, carbonyl or a divalent group derived by removing two hydroxyl groups from a boric, silicic, phosphorous, phosphoric, phosphinic, phosphinous, phosphonic, sulfuric, sulfurous, sulfenic, sulfinic or sulfonic acid, and when n is 3,
$R_3$ represents triacyl, aryltricarbamoyl, aryltristhiocarbamoyl or a trivalent group derived by removing three hydroxyl groups from a boric, silicic, phosphorous, phosphoric, phosphinic, phosphinous, phosphonic, sulfuric, sulfurous, sulfenic, sulfinic or sulfonic acid, or an inorganic or organic salt thereof.

2. The synthetic polymer composition according to claim 1 wherein said 4-aminopiperidine derivative is incorporated in an amount of 0.01 – 5.0 percent by weight, based upon the amount of the synthetic polymer.

3. The synthetic polymer composition according to claim 1 wherein said polymer is a polyolefin.

4. The synthetic polymer composition according to claim 1 wherein said polymer is a polyvinyl chloride.

5. The synthetic polymer composition according to claim 1 wherein said polymer is a polyurethane.

6. The synthetic polymer composition according to claim 1 wherein said 4-aminopiperidine derivative is selected from the group consisting of
4-acetamido-2,2,6,6-tetramethylpiperidine,
4-stearamido-2,2,6,6-tetramethylpiperidine,
4-acrylamido-2,2,6,6-tetramethylpiperidine,
4-methacrylamido-2,2,6,6-tetramethylpiperidine,
1-acryloyl-4-acrylamido-2,2,6,6-tetramethylpiperidine,
4-benzamido-2,2,6,6-tetramethylpiperidine,
4-(3-benzylureido)-2,2,6,6-tetramethylpiperidine,
4-(3-cyclohexylureido)-2,2,6,6-tetramethylpiperidine,
4-(3-phenylureido)-2,2,6,6-tetramethylpiperidine,
4-(p-toluenesulfonamido)-2,2,6,6-tetramethylpiperidine,
4-(4-hydroxy-3,5-di-tert.butylbenzylamino)-2,2,6,6-tetramethylpiperidine,
4-(N-benzoyloxyethylbenzamido)-2,2,6,6-tetramethylpiperidine,
4-(N-benzylbenzamido)-2,2,6,6-tetramethylpiperidine,
4-phthalimido-2,2,6,6-tetramethylpiperdine,
N,N'-bis(2,2,6,6-tetramethyl-4-piperidyl)malonamide,
N,N'-bis(2,2,6,6-tetramethyl-4-piperidyl)adipamide,
N,N'-bis(2,2,6,6-tetramethyl-4-piperidyl)terephthalamide,
p,p'-bis[3-(2,2,6,6-tetramethyl-4-piperidyl)ureido]-diphenylmethane,
2,4-bis[3-(2,2,6,6-tetramethyl-4-piperidyl)ureido] -toluene, and
tris(2,2,6,6-tetramethyl-4-piperidylamino)phosphine oxide.

* * * * *